United States Patent
Lemm

(10) Patent No.: US 7,147,097 B2
(45) Date of Patent: Dec. 12, 2006

(54) TRANSVERSE-ROLLER-BELT SORTER WITH AUTOMATED GUIDE

(75) Inventor: Christoph Lemm, Almere (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/711,684

(22) Filed: Sep. 30, 2004

(65) Prior Publication Data

US 2006/0070855 A1    Apr. 6, 2006

(51) Int. Cl.
*B65G 47/34* (2006.01)
*B65G 47/46* (2006.01)

(52) U.S. Cl. .................. 198/370.01; 198/367; 198/351

(58) Field of Classification Search ................ 198/367, 198/367.1, 370.01, 370.07, 370.08, 370.09, 198/779, 457.05, 457.06
See application file for complete search history.

(56) References Cited

U.S. PATENT DOCUMENTS

| 1,532,228 | A | * | 4/1925 | Carpenter | 198/367 |
| 1,729,671 | A | * | 10/1929 | Bell-Irving et al. | 198/367 |
| 2,728,466 | A | * | 12/1955 | Postlewaite et al. | 198/349.3 |
| 3,550,756 | A | | 12/1970 | Kornylak | 198/853 |
| 3,721,331 | A | * | 3/1973 | Holbrook et al. | 198/367 |
| 3,835,979 | A | * | 9/1974 | Calvert et al. | 198/363 |
| 4,147,248 | A | * | 4/1979 | Kurczak et al. | 198/358 |
| 4,850,471 | A | * | 7/1989 | Annas et al. | 198/349.3 |
| 5,400,895 | A | * | 3/1995 | Hollingsworth et al. | 198/367 |
| 5,655,643 | A | * | 8/1997 | Bonnet | 198/370.08 |
| 5,988,356 | A | * | 11/1999 | Bonnet | 198/598 |
| 6,044,956 | A | * | 4/2000 | Henson et al. | 198/370.02 |
| 6,148,990 | A | * | 11/2000 | Lapeyre et al. | 198/779 |
| 6,568,522 | B1 | | 2/2003 | Boelaars | 198/347.2 |
| 6,536,580 | B1 | | 3/2003 | Fritzsche | |
| 6,607,065 | B1 | | 8/2003 | Peppel | 198/367 |
| 6,758,323 | B1 | * | 7/2004 | Costanzo | 198/457.02 |
| 2004/0231960 | A1 | * | 11/2004 | Wolf | 198/370.08 |

OTHER PUBLICATIONS

European Patent Office, Written Opinion of the International Searching Authority, PCT/US2005/035066, mailing date May 15, 2006.

* cited by examiner

*Primary Examiner*—Gene O. Crawford
*Assistant Examiner*—Mark A. Deuble
(74) *Attorney, Agent, or Firm*—James T. Cronvich

(57) ABSTRACT

A bidirectional sorter using an automated guide to selectively divert articles off a transverse roller-top conveyor belt. A sorting station forms a segment of a conveying line conveying articles in a conveying direction. The sorting station includes a transverse roller-top belt having rollers protruding above an outer surface of the belt. The rollers are arranged to rotate about axes in the conveyor direction to provide a low-friction rolling surface to articles being pushed sidewise on the belt. A guide suspended above the belt is positionable over the belt at positions to intercept conveyed articles and guide them atop the rollers off one side of the belt or the other. The guide is also movable to a bypass position that allows conveyed articles to pass freely through the sorting station.

23 Claims, 4 Drawing Sheets

TRANSVERSE-ROLLER-BELT SORTER WITH AUTOMATED GUIDE

BACKGROUND

The invention relates generally to power-driven conveyors and, more particularly, to sorting systems using roller-top conveyor belts to divert articles from one side or the other of a main conveyor.

In the tire industry, finished tires leave the inspection area in a mix of various types and sizes. Usually the tires are sorted automatically, using bar codes or colored line codes to designate type or size. Transported on a sorting conveyor, the tires are identified by a bar code or color code reader, or sometimes even by a human operator that recognizes the tire type and pushes the appropriate identification button. As soon as an identified tire passes the proper exit of the sorter conveyor for that type of tire, the tire is moved sideways at a 90° angle onto an exit conveyor that conveys the tire to the proper palletizing or storage station. Classical sorting systems use a complex set up of narrow belts and pop-up driven rollers to make the 90° diversion.

Several conventional sorting systems use transverse-roller-top belts in line with a main conveyor. Simple pneumatic or electric pushers push an identified tire off the side of the transverse-roller-top belt onto an exit conveyor. A disadvantage of this system is that it is difficult to transfer tires onto exit conveyors when they are positioned opposite each other across the main conveyor.

Thus, there is a need for a less complex sorting system for tires and other articles.

SUMMARY

This need and other needs are satisfied by a sorting conveyor embodying features of the invention. The sorter comprises a sorting station that forms a segment of a conveying line conveying articles in a conveying direction. The sorting station comprises a roller-top conveyor belt that extends laterally in width from a first side to a second side. The belt travels in the conveying direction. Salient portions of rollers protrude outward from an outer surface of the belt to support a conveyed article. The rollers can be rotated to urge a conveyed article toward the first or second side of the belt. An elongated guide, which extends in length from a first end to a second end, is suspended above the outer surface of the belt. The guide is selectively positioned in a first position and in a second position. In the first position, the guide traverses the width of the belt to intercept a conveyed article and guide it atop the rollers off the first or second side of the belt. In the second position, the guide does not intercept a conveyed article and, instead, allows it to continue its advance in the conveying direction.

Another version of sorting conveyor also comprises a sorting station forming a segment of the conveying line conveying articles in a conveying direction. The sorting station comprises a roller-top conveyor belt and an elongated guide. The roller-top belt, which extends in width laterally from a first side to a second side, travels in the conveying direction. Rollers protrude outward of a horizontal upper surface of the belt to support conveyed articles. The rollers are arranged to rotate about axes generally in the conveying direction. The guide forms a generally vertical wall that extends in length from a first end to a second end. The guide is suspended above the upper surface of the belt and is positionable in one or more blocking orientations and in one or more non-blocking orientations. In a blocking orientation, the guide crosses the belt from the first side to the second side to intercept a conveyed article and guide it atop the rollers off the first or second side of the belt. In a non-blocking orientation, the guide does not intercept a conveyed article but, instead, lets it continue to advance in the conveying direction.

Another version of sorting conveyor comprises a sorting station that forms a segment of a conveying line conveying articles in a conveying direction. The sorting station includes a roller-top conveyor belt that extends laterally from a first side to a second side. The belt, which travels in the conveying direction, has rollers that protrude outward of an upper surface of the belt to support a conveyed article. The rollers are arranged to rotate about axes generally in the conveying direction. The sorting station also includes an elongated guide forming a wall that extends in length from a first end to a second end above the upper surface of the belt. A drive in the sorting station has a moving element that is attached to the guide to adjust the orientation of the wall. The sorting conveyor also comprises a sensor disposed along the conveying line to sense a characteristic of a conveyed article at a position along the conveying line upstream of the sorting station. The sensor sends a signal indicative of the characteristic to a controller, which controls the drive to adjust the orientation of the wall as a function of the signal associated with a conveyed article.

According to another aspect of the invention, a sorting conveyor comprises a bidirectional sorting station that forms a segment of a conveying line conveying articles in a conveying direction. The sorting station includes a roller-top conveyor belt, first and second exit conveyors, and an elongated guide. The roller-top belt, which extends in width laterally from a first side to a second side travels in the conveying direction. The belt includes rollers having salient portions protruding outward from an outer surface of the belt. The rollers, which support a conveyed article, can be rotated to urge a conveyed article toward the first or second side of the belt. The first and second exit conveyors abut the belt at its first and second sides. The elongated guide, which extends in length from a first end to a second end, is suspended above the outer surface of the belt. The guide is selectively positionable in various positions. In a first diverting position, the guide traverses the width of the belt with the first end of the guide at the first side of the belt and the second end of the guide at the second side of the belt and downstream of the first end. In this position, the guide intercepts a conveyed article and guides it atop the rollers off the second side of the belt and onto the second exit conveyor. In a second diverting position, the guide traverses the width of the roller-top belt with the first end of the guide at the second side of the belt and the second end of the guide at the first side of the belt and downstream of the first end. In this second diverting position, the guide intercepts a conveyed article and guides it atop the rollers off the first side of the belt onto the first exit conveyor. In a bypass position, the guide does not intercept a conveyed article; instead, the article is allowed to continue to advance in the conveying direction past the sorting station.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
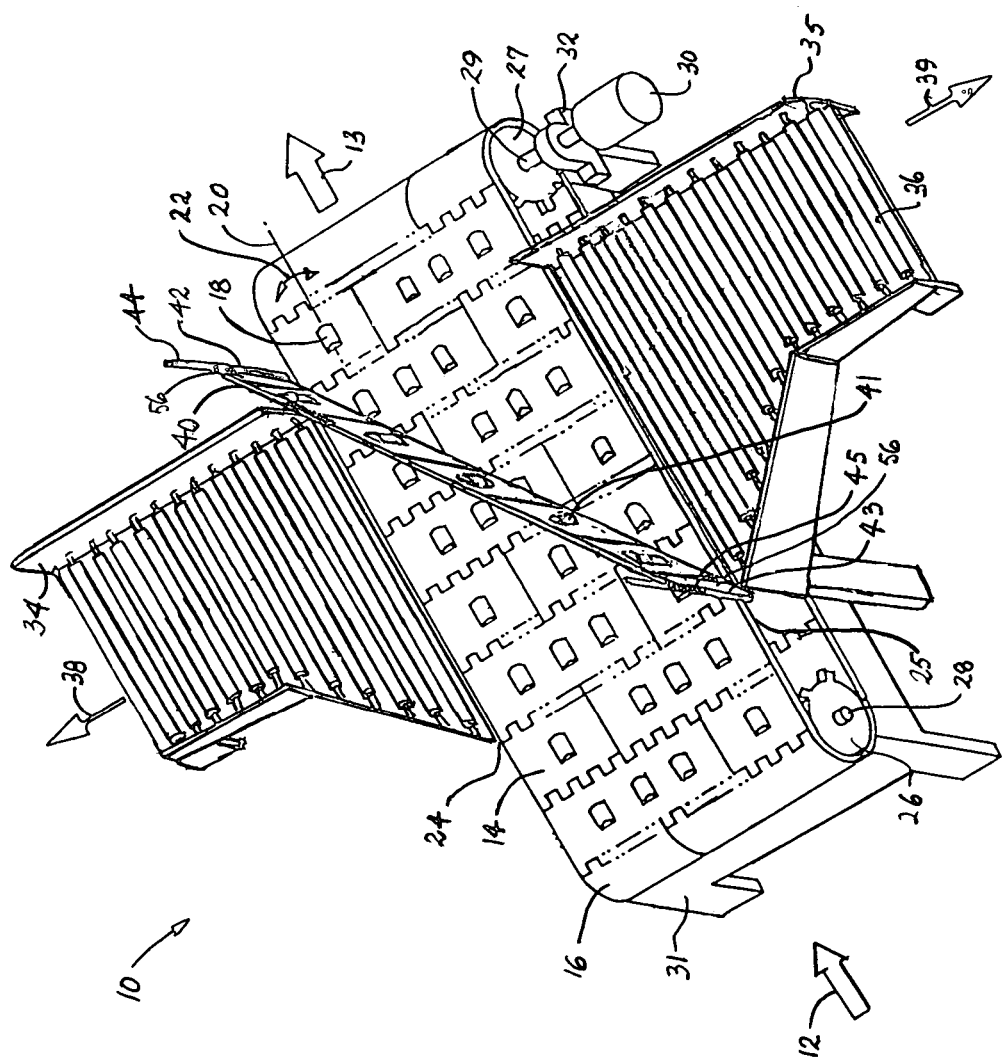
FIG. 1 is an isometric view of a portion of a conveying line with a sorting conveyor embodying features of the invention.

One version of a sorting conveyor embodying features of the invention is shown in FIG. 1. The sorting conveyor comprises a sorting station 10 that forms a segment of a conveyor line, including upstream and downstream conveyors represented by arrows 12 and 13. The upstream conveyor transports articles, such as tires, in a conveying direction given by the direction of the arrows 12, 13 onto the top, outer surface 14 of a roller-top belt 16. The roller-top belt shown is a transverse-roller-top belt having a plurality of rollers 18 arranged to rotate on axes 20 generally in the conveying direction. In this way, the rollers can be made to rotate in the direction of two-headed arrow 22 to act as a freely rollable contact urging articles off a first or second side 24, 25 of the belt. In a preferred version, the rollers are generally cylindrical in shape with a salient portion protruding outward of the upper article-conveying surface. The preferred rollers have central bores admitting an axle whose ends are retained in the body of the belt. The rollers are retained in cavities in the belt by the axles. Unless the articles receive a push toward one side or the other, the rollers do not rotate. An example of such a belt is an Intralox Series 400 Transverse Roller-Top belt manufactured and sold by Intralox, L.L.C., Harahan, La., USA. The Intralox belt is a modular plastic conveyor belt constructed of rows of modules interconnected typically in a bricklay pattern by hinge pins through a lateral passageway formed by the aligned openings in interleaved hinge eyes at the leading and trailing ends of the belt rows. Alternatively, other types of roller-top belts with rollers that can rotate to impart a rolling action conducive to sidewise transfer of articles off the sides of the belt can be used. Examples include roller-top flat rubber or fabric belts and metal roller-top belts or chains.

The roller-top belt 16 is looped around an idler sprocket set 26 and a drive sprocket set 27. The idler sprocket set is mounted on an idler shaft 28 rotatably supported at each end by bearings (not shown) mounted in the conveyor frame 31. The drive sprocket set is mounted on a drive shaft 29 coupled to a motor 30 via a bearing block 32 secured to the conveyor frame. Teeth on the sprockets engage drive structure in the inner side of the belt. In this way, the motor drives the belt to advance its outer conveying surface toward the downstream conveyor 13.

The roller-top conveyor belt is flanked on opposite sides by exit conveyors 34, 35. The exit conveyors shown in this example are conventional gravity-advance roller conveyors. The exit conveyors include a downwardly sloping frame supporting a plurality of consecutive rolls 36 that are free to rotate about their axes to discharge articles in the direction of arrows 38 and 39. A guide 40 is suspended above the outer conveying surface of the roller-top belt. The guide traverses the width of the belt from the first side to the second side. Opposite first and second ends 42, 43 of the guide are attached to arms 44, 45. The guide shown includes rollers 41 that protrude beyond both sides of the guide. The rollers preferably rotate about generally vertical axes to provide a low-friction rolling surface to articles conveyed on the generally horizontal roller-top belt. The guide may be realized in many ways. One way is as an Intralox Series 900 Roller Top belt. The guide forms a generally vertical wall that can intercept articles advancing along the conveyor line.

Figure 2A:
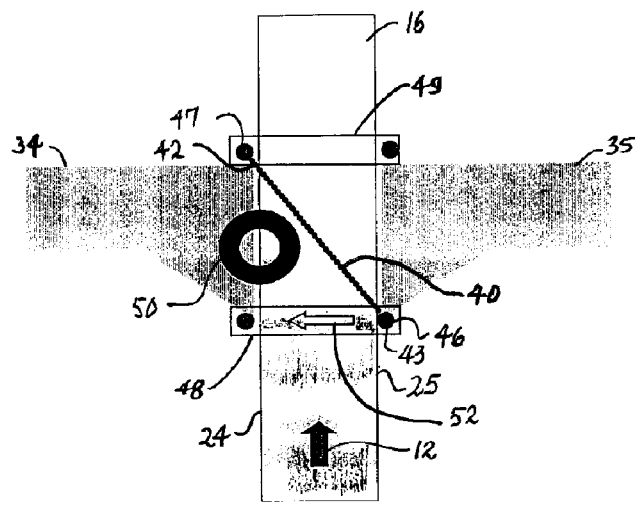
FIG. 2A is a top schematic representation of the sorting conveyor of FIG. 1 with a guide positioned to divert a tire to the left.
Figure 2B:
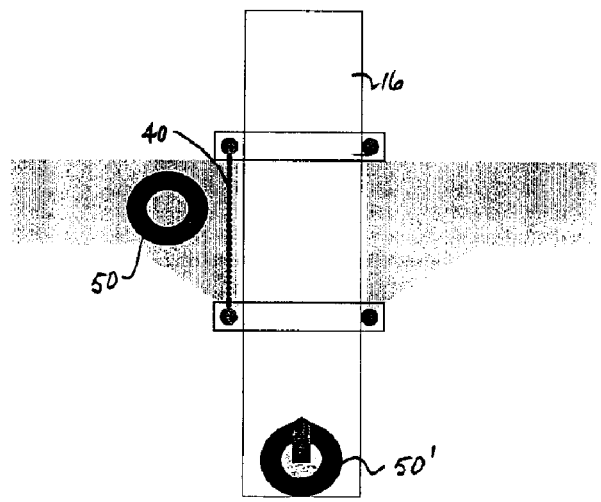
FIG. 2B is a top schematic as in FIG. 2A with the guide positioned to allow a tire to bypass the sorting station.
Figure 2C:
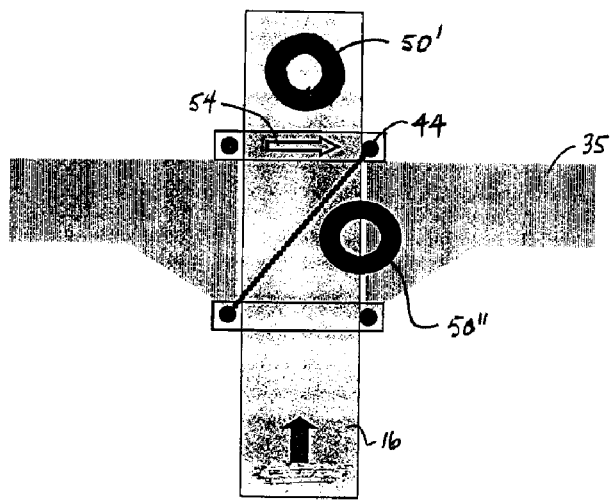
FIG. 2C is a top schematic as in FIG. 2A with the guide positioned to divert a tire to the right.

As better illustrated in FIGS. 2A–2C, the ends of the guide are attached to the arms 44, 45 of moving elements 46, 47 of linear actuators or drivers 48, 49. The moving elements may be pneumatically, hydraulically, or electromagnetically driven or driven by a motor and gear such as a lead screw. The linear drives are positioned in an upstream-downstream relationship traversing the roller-top belt. The linear drives define a track traversing the belt from the first side to the second side. The arms translate laterally along the tracks across the belt to position the ends of the guide on one side of the belt or the other.

In FIG. 2A, for instance, a conveyed article, such as a tire 50, is diverted to the left at the sorting station. The upstream end 43 of the guide is positioned at the right side of the roller-top belt 16 in the figure. The downstream end 44 is positioned at the left side. The guide 40 traverses the roller-top belt and intercepts the tire. The rollers on the roller-top belt and in the guide cause the tire to move sidewise toward the left exit conveyor 34. Once the tire 50 has been intercepted, the guide is ready to be moved into another position. In this example, the next tire 50' is selected to pass on through the sorting station toward the downstream conveyor. The upstream end 43 of the guide is driven to the left side of the roller-top belt, as indicated by arrow 52. The guide is then oriented along the left side of the belt as shown in FIG. 2B. In this position, the second tire 50' passes through as the first tire 50 continues its left exit. Of course, the bypass position could have been achieved by positioning the guide at the right side of the roller-top belt by moving the downstream end to the right. But this movement does not provide the added benefit of pushing the first tire 50 toward its intended exit. In FIG. 2C, the downstream end 44 of the guide is moved to the right side, as indicated by arrow 54, as soon as the second tire clears the sorting station. Now the guide traverses the roller-top belt along an angle relative to the conveying direction that mirrors the angle of the guide for diverting articles to the left. In this orientation, the guide diverts the third tire 50" to the right-side exit conveyor. Thus, by shuttling the two ends of the guide across the roller-top belt at upstream and downstream locations a bidirectional sorter with low-friction sideward translation is achieved.

Figure 3:
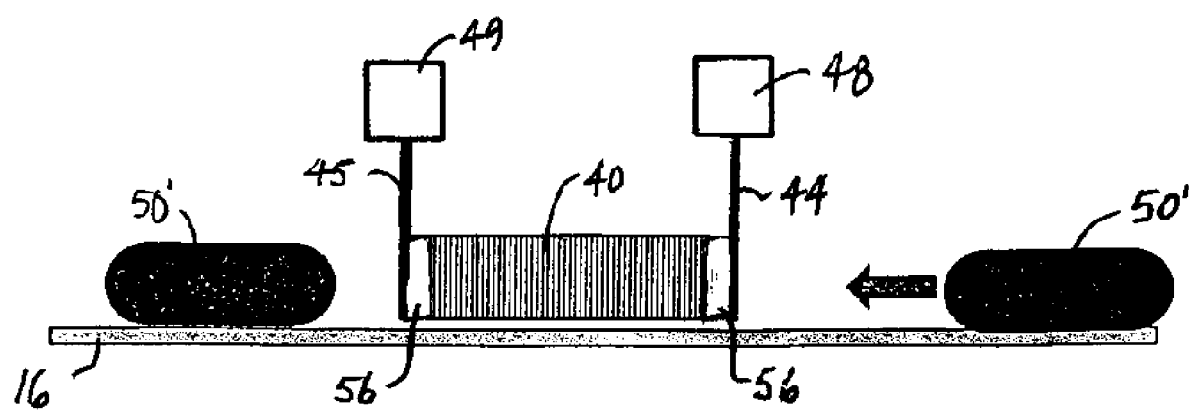
FIG. 3 is a side elevation schematic representation of the sorting conveyor of FIG. 1.

Because the guide has to span a greater distance when blocking the conveying path, as in FIGS. 2A and 2C, than it does when in the non-blocking position of FIG. 2B, the guide preferably has an automatically adjustable length. One or more elastic panels, such as end panels 56 (FIGS. 1 and 3), connected between each arm 44, 45 and the nearest end of the guide, allow the guide to stretch into its expanded length for blocking and retract to its relaxed length for bypassing.

Figure 4A:
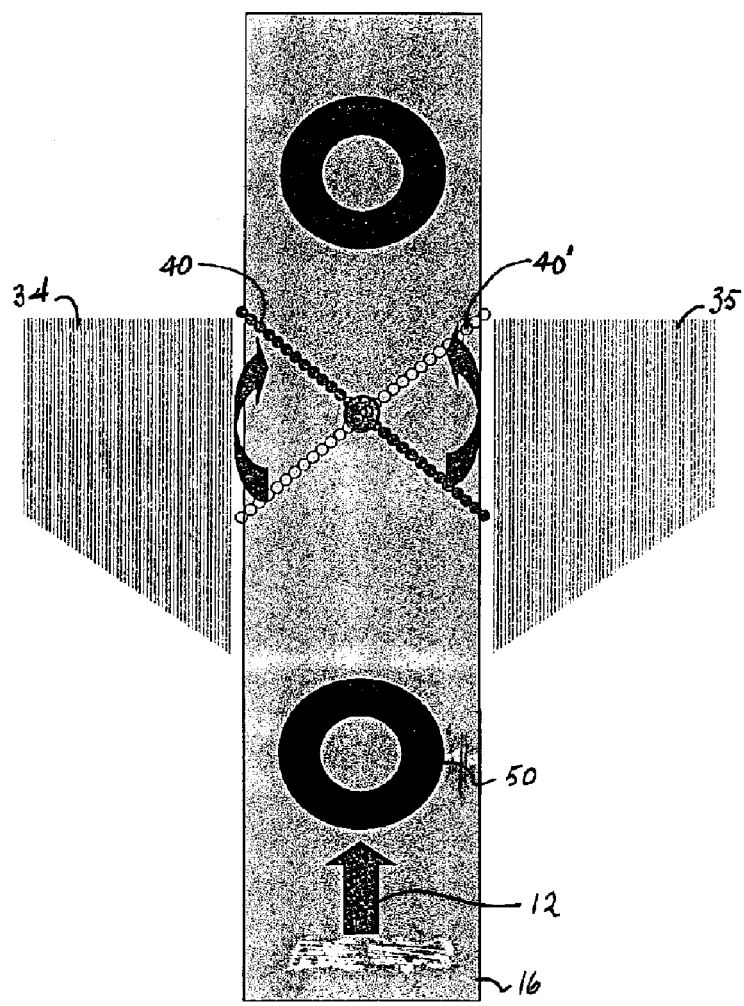
FIG. 4A is a top schematic representation of another version of a sorting conveyor embodying a rotating guide.
Figure 4B:
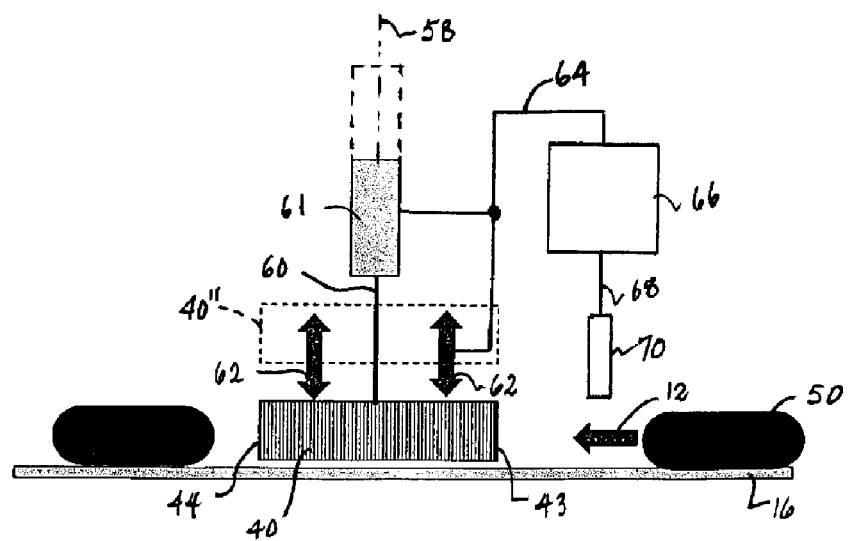
FIG. 4B is a side elevation schematic representation of the sorting conveyor of FIG. 4A.

Another version of sorting conveyor is represented by FIGS. 4A and 4B. This version differs from the conveyor described previously in that the guide 40 pivots about a vertical axis 58 along a pivot shaft 60 attached generally midway between the ends 43, 44 of the guide. This positions the pivot point at about the center line of the roller-top belt 16. As shown in FIG. 4A, the guide assumes a first position to divert articles to the left into the left exit conveyor 34. The guide is rotated by a motor 61 coupled to the shaft about 90° into the mirror-image orientation 40' to divert articles to the right exit discharge conveyor 35. The bypass position 40" is achieved by a lift mechanism, represented by arrows 62, that selectively raises and lowers the guide into and out of a blocking position over the roller-top belt. The lift mechanism can be motor-driven or hydraulically, pneumatically or electromagnetically actuated.

The rotation motor 61 and the lift 62 are controlled over control lines or channels 64 from a controller 66, such as a programmable logic controller, general-purpose computer, or any other intelligent controller. The controller also processes sensor signals over a signal line 68 from one or more sensors 70. Each sensor detects a specific characteristic of a conveyed article upstream of the sorting station. Examples of characteristics that may be sensed include proximity to the sorting station, tire size, tire model, or the like. Typical sensors include bar code readers, color bar readers, RFID tag readers, proximity switches, and optical sensors, for example.

Although the invention has been described in detail with respect to a few exemplary versions, other versions are possible. For example, the lift mechanism can be used with the linear drives as well as with the rotational drive to achieve the bypass position. As another example, a unidirectional sorter can be made by using a single linear drive with one end of the guide attached to the moving element of the linear drive and the other end stationarily, but pivotally, attached at one side of the roller-top belt. And, as yet another example, the guide can be in the form of a swinging gate extendable across the roller-top belt and rotatable about a vertical axis at one side of the belt to realize a bidirectional sorter that diverts conveyed articles at locations on opposite ends of the belt, but offset in the conveying direction. So, as these few examples suggest, the scope of the invention is not meant to be limited to the specific features of the preferred version described in detail.

What is claimed is:

1. A sorting conveyor comprising:
    a sorting station forming a segment of a conveying line conveying articles in a conveying direction, the sorting station comprising:
        a roller-top conveyor belt extending in width laterally from a first side to a second side and traveling in the conveying direction, the roller-top conveyor belt including a plurality of rollers having salient portions protruding outward from an outer surface of the belt to support a conveyed article and capable of being rotated to enable conveyed articles atop the rollers to be diverted toward the first or second side of the belt,
        an elongated guide extending in length from a first end to a second end and suspended above the outer surface of the belt and selectively positionable in a first position traversing the width of the belt to intercept a conveyed article and guide it atop the rollers off the first or second side of the belt and in a second position not intercepting a conveyed article to allow it to continue to advance in the conveying direction,
        a linear drive disposed at a first location defining a lateral track above the roller-top conveyor belt and traversing the belt, the linear drive having a downwardly extending arm selectively driven along the track, and
        wherein the first end of the elongated guide is attached to the arm and the guide is in the first position when the arm is at the first side of the belt and in the second position when the arm is at the second side of the belt.

2. A sorting conveyor as in claim 1 wherein the railers include axles defining axes in the conveying direction about which the rollers rotate.

3. A sorting conveyor as in claim 1 further comprising a sensor disposed upstream of the sorting station for sensing a predetermined characteristic of a conveyed article to control the position of the elongated guide in the sorting station.

4. A sorting conveyor as in claim 1 wherein the elongated guide is selectively positionable at a third position intercepting a conveyed article and guiding it atop the rollers off the opposite side of the belt as the guide in the first position.

5. A conveyor belt as in claim 4 wherein the guide is selectively positionable at a fourth position not intercepting a conveyed article.

6. A sorting conveyor as in claim 1 further comprising:
    a second linear drive disposed at a second location upstream of the first location and defining a lateral track above the roller-top conveyor belt that traverses the belt the linear drive having a downwardly extending arm selectively driven along the track, and
    wherein the second end of the elongated guide is attached to the arm and is movable from the first side of the belt to the second side of the belt.

7. A sorting conveyor as in claim 1 wherein the elongated guide includes rotatable elements arranged to engage a conveyed article in rolling contact when the guide is in the first position.

8. A sorting conveyor as in claim 7 wherein the elongated guide includes a conveyor belt segment arranged generally perpendicular to the plane defined by the outer surface of the roller-top conveyor belt and having roller wheels as the rotatable elements extending outward into rolling contact with a conveyed article.

9. A sorting conveyor as in claim 1 wherein the guide includes one or more elastic elements to adjust the length of the guide between the first and second positions.

10. A sorting conveyor as in claim 9 wherein at least one of the elastic elements is at the first end of the elongated guide.

11. A sorting conveyor as in claim 1 wherein the sorting station further comprises a lift for lifting the guide into the second position high enough above the outer surface of the roller-top belt to avoid intercepting a conveyed article.

12. A sorting conveyor comprising:
    a sorting station forming a segment of a conveying line conveying articles in a conveying direction, the sorting station comprising:
        a roller-top conveyor belt extending in width laterally from a first side to a second side and traveling in the conveying direction, the roller-top conveyor belt including a plurality of rollers having salient portions protruding outward from an outer surface of the belt to support a conveyed article and capable of being rotated to enable a conveyed article atop the rollers to be diverted toward the first or second side of the belt,
        an elongated guide extending in length from a first end to a second end and suspended above the outer surface of the belt and selectively positionable in a first position traversing the width of the belt to intercept a conveyed article and guide it atop the rollers off the first or second side of the belt and in a second position not intercepting a conveyed article to allow it to continue to advance in the conveying direction, a rotational drive disposed above the roller-tap conveyor belt, the rotational drive having a downwardly extending rotatable pivot shaft defining a pivot axis intersecting the belt generally midway across the width of the belt, wherein the pivot shaft is attached to the elongated guide generally midway between the first end and the second end to selectively rotate the elongated guide between the first position at an angle relative to the conveying direction to divert a conveyed article off the first side of the belt and a third position at a different angle relative to the conveying direction to divert an article off the second side of the belt.

13. A sorting conveyor as in claim 12 wherein the angle of the guide in the first position differs from the different angle of the guide in the second position by about 90°.

14. A sorting conveyor as in claim 12 wherein the elongated guide is linear.

15. A sorting conveyor comprising:
a sorting station forming a segment of a conveying line conveying articles in a conveying direction, the sorting station comprising:
   a roller-top conveyor belt extending in width laterally from a first side to a second side and traveling in the conveying direction, the roller-top conveyor belt including a plurality of rollers protruding outward of a horizontal upper surface of the belt to support a conveyed article and arranged to rotate about axes generally in the conveying direction,
   an elongated guide forming a generally vertical wall extending in length from a first end to a second end and suspended above the upper surface of the belt and selectively positionable in one or more blocking orientations crossing the belt from the first side to the second side to intercept a conveyed article and guide it atop the rollers off the first or second side of the belt and in one or more non-blocking orientations not intercepting a conveyed article to allow it to continue to advance in the conveying direction,
   wherein the elongated guide includes roller wheels having low-friction surfaces extending from the wall and rotatable about vertical axes to engage a conveyed article in low-friction rolling contact; and
   a drive disposed above the conveyor belt and coupled to the elongated guide to position the wall across the upper surface of the belt at one or more angles relative to the conveying direction.

16. A sorting conveyor as in claim 15 wherein the elongated guide includes elastic elements to adjust its length.

17. A sorting conveyor as in claim 15 wherein the sorting station comprises a sensor disposed upstream of the sorting station for sensing a predetermined characteristic of a conveyed article to activate the drive to selectively orient the elongated guide in the sorting station.

18. A sorting conveyor as in claim 15 wherein the drive positions the wall at a first angle oblique to the conveying direction and at a second angle mirroring the first angle about the centerline of the belt.

19. A sorting conveyor as in claim 15 wherein the drive rotates the guide about its midpoint.

20. A sorting conveyor as in claim 15 wherein the drive includes a first linear drive having a moving element selectively shuttling laterally across the belt, the moving element being attached to the first end of the guide to translate the first end of the guide laterally between the first and second sides of the belt.

21. A sorting conveyor as in claim 20 wherein the drive includes a second linear drive disposed upstream of the first linear drive and having a moving element selectively shuttling laterally across the belt, the moving element being attached to the second end of the guide to translate the second end of the guide laterally between the first and second sides of the belt.

22. A sorting conveyor as in claim 15 wherein the sorting station further comprises a lift connected to the guide for lifting the guide above the upper surface of the roller-top belt into a non-blocking orientation and lowering the guide into a blocking orientation.

23. A sorting conveyor comprising:
a bidirectional sorting station forming a segment of a conveying line conveying articles in a conveying direction, the sorting station comprising:
   a roller-top conveyor belt extending in width laterally from a first side to a second side and traveling in the conveying direction, the roller-top conveyor belt including a plurality of rollers having salient portions protruding outward from an outer surface of the belt to support a conveyed article and mounted on axles retained in the conveyor belt generally in the conveying direction, enabling the rollers to be rotated to enable a conveyed article atop the rollers to be diverted toward the first or second side of the belt,
   first and second exit conveyors abutting the belt at the first and second sides, respectively, for receiving conveyed articles diverted off the first and second sides of the belt,
   a first linear drive disposed at a first location defining a first lateral track above the outer surface of the belt and generally perpendicularly traversing the belt and a second linear drive disposed at a second location spaced from the first location in the conveying direction and defining a parallel second lateral track above the outer surface of the belt,
   an elongated guide extending in length from a first end riding along the first track to a second end riding along the second track and disposed above the outer surface of the belt and selectively positioned by the first and second linear drives in:
      a first diverting position traversing the width of the belt with the first end of the guide at the first side of the belt and the second end of the guide at the second side of the belt and downstream of the first end to intercept a conveyed article and guide it atop the rollers off the second side of the belt onto the second exit conveyor,
      a second diverting position traversing the width of the belt with the first end of the guide at the second side of the belt and the second end of the guide at the first side of the belt and downstream of the first end to intercept a conveyed article and guide it atop the rollers off the first side of the belt onto the first exit conveyor,
      and a bypass position not intercepting a conveyed article to allow it to continue to advance in the conveying direction past the sorting station.

* * * * *